(12) United States Patent
Lee et al.

(10) Patent No.: US 8,644,366 B2
(45) Date of Patent: Feb. 4, 2014

(54) METHOD AND APPARATUS FOR TRANSMITTING URGENT DATA

(75) Inventors: Jae-min Lee, Suwon-si (KR); Ji-sung Oh, Seongnam-si (KR); Il-ju Na, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 12/966,503

(22) Filed: Dec. 13, 2010

(65) Prior Publication Data

US 2011/0142160 A1 Jun. 16, 2011

(30) Foreign Application Priority Data

Dec. 14, 2009 (KR) ........................ 10-2009-0124007

(51) Int. Cl.
*H04B 1/38* (2006.01)
(52) U.S. Cl.
USPC .......................................... 375/219; 375/295

(58) Field of Classification Search
USPC .......................... 375/219–222, 295, 260, 316
See application file for complete search history.

(56) References Cited

U.S. PATENT DOCUMENTS

| 4,723,237 | A  | * | 2/1988  | Andrew et al. ............... 370/204 |
| 6,212,407 | B1 | * | 4/2001  | Hiramatsu ................ 455/562.1 |
| 6,786,624 | B2 | * | 9/2004  | Poorman ....................... 362/539 |
| 2002/0186792 | A1 | * | 12/2002 | Gabara et al. ................. 375/324 |
| 2005/0105901 | A1 | * | 5/2005  | Yavor et al. ..................... 398/30 |
| 2009/0060066 | A1 | * | 3/2009  | Walker ........................... 375/260 |
| 2011/0103404 | A1 | * | 5/2011  | Bafra et al. ................... 370/476 |
| 2011/0194595 | A1 | * | 8/2011  | Shetty ........................... 375/224 |

* cited by examiner

*Primary Examiner* — Emmanuel Bayard
(74) *Attorney, Agent, or Firm* — Sughrue Mion, PLLC

(57) ABSTRACT

A method and apparatus for transmitting urgent data by embedding the urgent data in normal data is provided. An urgent data signal is embedded in a normal data signal in such a way that the normal data signal is not affected, and then the urgent data signal is transmitted together with the normal data signal thereby stably transmitting urgent data without using a separate urgent data line.

51 Claims, 9 Drawing Sheets

METHOD AND APPARATUS FOR TRANSMITTING URGENT DATA

CROSS-REFERENCE TO RELATED PATENT APPLICATION

This application claims priority from Korean Patent Application No. 10-2009-0124007, filed on Dec. 14, 2009, in the Korean Intellectual Property Office, the disclosure of which is incorporated herein in its entirety by reference.

BACKGROUND

1. Field

Methods and apparatuses consistent with that exemplary embodiments relate to transmitting urgent data, and more particularly, to a method and apparatus for transmitting urgent data by embedding the urgent data in normal data while transmitting the normal data.

2. Description of the Related Art

Recently, wired network solutions, such as high-definition multimedia interface (HDMI) and digital interactive interface for video and audio (DiiVA), are widely used to transmit in-compressed audio/video (AV) data. Most wired network solutions include control protocols for controlling consumer electronics (CE) devices. One of the control protocols is an HDMI-consumer electronics control (CEC) protocol in which a separate transmission line is assigned for CEC in HDMI. The HDMI has a pass-through function, and thus a device supporting a different standard is connected to an HDMI device as a dongle so as to replace an HDMI cable. Here, HDMI-CEC messages are mapped one to one and transmitted through another data network.

FIG. 1 is a diagram illustrating a structure of a block used in an HDMI-CEC protocol.

Referring to FIG. 1, the block includes 8 information bits, an end of message (EOM) bit, and an acknowledgement (ACK) bit. The ACK bit indicates whether a receiver normally received the block.

In the HDMI-CEC protocol, the information bits in such blocks are gathered to form one message. The maximum 16 blocks form one message, wherein a first block is referred to as a header block, and the blocks following the first block are referred to as data blocks.

A network that does not include a separate CEC line is referred to as a non-CEC network. Examples of the non-CEC network include Ethernet, WiFi, and Bluetooth. FIG. 2 is a diagram schematically illustrating structures of data transceivers 210 and 220 of a general non-CEC network. The non-CEC network includes a bidirectional data channel, and thus the data transceivers 210 and 220 may transmit and receive a data packet between each other.

Referring to FIG. 2, a transmitter 211 of the data transceiver 210 generates a normal data signal 22 by receiving and performing modulation or encoding on normal data 21, and a receiver 221 of the data transceiver 220 generates and outputs normal data 23 by receiving the normal data signal 22 and performing demodulation or decoding corresponding to the modulation or encoding. If there is no error, the normal data 21 and the normal data 23 are identical. When the data transceiver 220 transmits normal data 24 through a transmitter 222, the data transceiver 210 receives normal data 26 through a receiver 212. When the transmitter 211 transmits a signal, an output of the transmitter 222 is in a high-impedance (Hi-Z) state, and vice versa. A wired network is described hereinabove, but it is obvious to one of ordinary skill in the art that the non-CEC network may be a wireless network.

FIG. 3 is a diagram for illustrating a case when two CEC devices 310 and 320 are connected through a non-CEC network.

Referring to FIG. 3, a CEC message generated by the CEC device 310 is transmitted to the CEC device 320 by using a data transmission method provided by the non-CEC network. In FIG. 3, a transmitter (TX) dongle 210-1 converts the CEC message to a message defined in the non-CEC network, and a receiver (RX) dongle 220-1 converts the message defined in the non-CEC network to the CEC message.

First, the CEC device 310 transmits the CEC message to the TX dongle 210-1. Upon receiving the CEC message, the TX dongle 210-1 transmits an ACK message to the CEC device 310. The TX dongle 210-1 converts the received CEC message into a data packet, and transmits the data packet to the RX dongle 220-1 through the non-CEC network. The RX dongle 220-1 converts the received data packet to the CEC message, and transmits the CEC message to the CEC device 320.

Here, if the data packet is not transmitted to the RX dongle 220-1 due to an error, the CEC device 320 may not receive the CEC message. However, since the CEC device 310 received the ACK message from the TX dongle 210-1, the CEC device 310 may determine that the CEC message has been normally transmitted to the CEC device 320.

For example, assuming that a video stream is transmitted from a Blu-ray disk player (BDP) to a digital television (DTV). When a one-touch play function from among CEC functions is executed in the BDP by a user, the BDP transmits an "image view on" message to the DTV so that the DTV enters an image output state. Then, the BDP transmits an "active source" message to the DTV so that the DTV converts to a corresponding HDMI connector. At this time, while transmitting the "image view on" message, the BDP receives an ACK message from the TX dongle 210-1 but the "image view on" message is not transmitted to the DTV, and the BDP transmits the "active source" message to the DTV anyway since the BDP determines that the "image view on" message has been transmitted to the DTV. Accordingly, the DTV receives the "active source" message while in a standby state. In this case, since the DTV simply checks that an active source has changed, the DTV is still in the standby state, but the BDP reproduces an image. The user checks that the DTV is not properly operating, and may continuously push a button.

If the TX dongle 210-1 transmits an ACK message to the CEC device 310 after transmitting the CEC message to the RX dongle 220-1 through the non-CEC network and receiving an ACK message from the RX dongle 220-1, the CEC message may be prevented from not being transmitted due to an error in the non-CEC network.

However in this case, the TX dongle 210-1 must receive the ACK message from the RX dongle 220-1 and transmit the ACK message to the CEC device 310 within about 1.9 msec, according to a CEC bit timing. However, such condition cannot be satisfied because when the CEC message is received while transmitting a data packet through the non-CEC network, the transmitting of the CEC message may be delayed due to the transmitting of the data packet.

FIG. 4 is a diagram for describing a transmission delay when a CEC message is received while transmitting a data packet.

Referring to FIG. 4, when the CEC message is received at a point of time t1, the CEC message is transmitted through the non-CEC network after a point of time t2, and thus the CEC message is delayed by at least a time t2−t1.

For example, when Fast Ethernet 100BASE-TX is used as the non-CEC network, the maximum delay time until the TX dongle 210-1 receives an ACK message from the RX dongle 220-1 may be 2.152 msec, and when WiHD 1.0 is used as the non-CEC network, the maximum delay time until the TX dongle 210-1 receives an ACK message from the RX dongle 220-1 may be 73.7 msec.

A length of the data packet may be reduced or the CEC message may be transmitted after stopping the transmitting of the data packet, but in this case, an overhead of the non-CEC network is increased, and thus transmission efficiency is decreased.

SUMMARY

The exemplary embodiments provide a method of transmitting urgent data, such as a consumer electronics control (CEC) message, in a non-CEC network.

The exemplary embodiments also provide a method of transmitting urgent data, wherein the urgent data, such as a CEC message that has a low data rate but needs to be urgently transmitted, is prevented from being delayed by transmitting the urgent data simultaneously with normal data by embedding the urgent data in the normal data.

According to an aspect of the exemplary embodiments, there is provided a method of transmitting high-speed data and low-speed data to a data receiver, wherein the method is performed by a data transmitter, the method including: generating a high-speed data signal including the high-speed data, by using a first transmission method; generating a low-speed data signal including the low-speed data, by using a second transmission method; generating a combined signal by embedding the low-speed data signal in the high-speed data signal; and transmitting the combined signal, wherein the second transmission method enables the data receiver to use a receiving method corresponding to the first transmission method while extracting the high-speed data from the combined signal, regardless of the low-speed data signal embedded in the combined signal.

The low-speed data may be consumer electronics control (CEC) information.

The first transmission method may be a first digital modulation method and the second transmission method may be a second digital modulation method, wherein a distance between constellation points of the second digital modulation method may be shorter than a distance between constellation points of the first digital modulation method.

The second digital modulation method may be a binary phase-shift keying (BPSK) method.

The first transmission method may be a band-limited communication method and the second transmission method may be a method of transmitting the low-speed data by using a spectral mask of the first transmission method.

The first transmission method may be an orthogonal frequency-division multiplexing (OFDM) method and the second transmission method may be a method of transmitting the low-speed data by using an unused subcarrier in the first transmission method.

The combined signal may be a differential signal, the first transmission method may be a method of transmitting the high-speed data in a differential mode signal, and the second transmission method may be a method of transmitting the low-speed data in a common mode signal.

The method may further include: receiving the high-speed data through a first transmission line; and receiving the low-speed data through a second transmission line, wherein the first and second transmission lines may be different lines.

The data transmitter may not have a separate low-speed data transmission line to the data receiver.

The method may further include: receiving a response from the data receiver that the low-speed data has been received; and after receiving the response from the data receiver, outputting through the second transmission line a response that the low-speed data has been received.

According to another aspect of the exemplary embodiments, there is provided a method of receiving high-speed data and low-speed data from a data transmitter, wherein the method is performed by a data receiver, the method including: receiving a combined signal generated by embedding a low-speed data signal using a second transmission method in a high-speed data signal using a first transmission method; extracting the high-speed data from the combined signal by using a receiving method corresponding to the first transmission method, regardless of the low-speed data signal embedded in the combined signal; and extracting the low-speed data from the combined signal by using a receiving method corresponding to the second transmission method.

The low-speed data may be consumer electronics control (CEC) information.

In the extracting of the low-speed data, the low-speed data may be extracted by using the extracted high-speed data.

The first transmission method may be a first digital modulation method and the second transmission method may be a second digital modulation method, wherein a distance between constellation points of the second digital modulation method may be shorter than a distance between constellation points of the first digital modulation method.

In the extracting of the high-speed data, the high-speed data may be extracted by demodulating the combined signal according to the first digital modulation method, and the extracting of the low-speed data may include: generating a high-speed data signal including the extracted high-speed data by using the first digital modulation method; generating a low-speed data signal by subtracting the generated high-speed data signal from the combined signal; and extracting the low-speed data by demodulating the generated low-speed data signal according to the second digital modulation method.

The second digital modulation method may be a binary phase-shift keying (BPSK) method.

The first transmission method may be a band-limited communication method, and the second transmission method may be a method of transmitting the low-speed data through a spectral mask of the first transmission method.

The first transmission method may be an orthogonal frequency-division multiplexing (OFDM) method, and the second transmission method may be a method of transmitting the low-speed data by using an unused subcarrier in the first transmission method.

The combined signal may be a differential signal, the first transmission method may be a method of transmitting the high-speed data in a differential mode signal, and the second transmission method may be a method of transmitting the low-speed data in a common mode signal.

In the extracting of the high-speed data, the differential mode signal may be extracted from the combined signal, and in the extracting of the low-speed data, the common mode signal may be extracted from the combined signal.

The method may further include: outputting the high-speed data through a first transmission line; and outputting the low-speed data through a second transmission line, wherein the first and second transmission lines may be different lines.

The data receiver may not have a separate low-speed data reception line from the data transmitter.

The method may further include: receiving a response that the low-speed data has been received through the second transmission line; and after receiving the response through the second transmission line, transmitting a response that the low-speed data has been received to the data transmitter.

According to another aspect of the exemplary embodiments, there is provided a method of converting a signal of a first network having a separate urgent data line to a signal of a second network not having a separate urgent data line, the method including: receiving normal data through a normal data line of the first network; receiving urgent data through the urgent data line of the first network; generating a normal data signal including the normal data by using a first transmission method; generating an urgent data signal including the urgent data by using a second transmission method; generating a combined signal by embedding the urgent data signal in the normal data signal; and transmitting the combined signal through the second network, wherein the second transmission method enables a data receiver to use a receiving method corresponding to the first transmission method while extracting the normal data from the combined signal, regardless of the urgent data signal embedded in the combined signal.

The method may further include: receiving through the second network a response that the urgent data has been received; and after receiving the response through the second network, transmitting through the urgent data line of the first network a response that the urgent data has been received.

According to another aspect of the exemplary embodiments, there is provided a method of converting a signal of a second network not having a separate urgent data line to a signal of a first network having a separate urgent data line, the method including: receiving a combined signal through the second network, wherein the combined signal is generated by embedding an urgent data signal according to a second transmission method in a normal data signal according to a first transmission method; extracting the normal data from the combined signal by using a receiving method corresponding to the first transmission method, regardless of the urgent data signal embedded in the combined signal; extracting the urgent data from the combined signal by using a receiving method corresponding to the second transmission method; transmitting the normal data through a normal data line of the first network; and transmitting the urgent data through the urgent data line of the first network.

In the extracting of the urgent data, the urgent data may be extracted by using the extracted normal data.

The method may further include: receiving through the urgent data line of the first network a first response that the urgent data has been received; and after receiving the first response through the urgent data line of the first network, transmitting through the second network a second response that the urgent data has been received.

The first network may be a high-definition multimedia interface (HDMI) network.

The urgent data may be consumer electronics control (CEC) information.

According to another aspect of the exemplary embodiments, there is provided a data transmitter for transmitting high-speed data and low-speed data to a data receiver, the data transmitter including: a high-speed data signal processor for generating a high-speed data signal including the high-speed data, by using a first transmission method; a low-speed data signal processor for generating a low-speed data signal including the low-speed data, by using a second transmission method; and an embedder for generating a combined signal by embedding the low-speed data signal in the high-speed data signal, and transmitting the combined signal, wherein the second transmission method enables the data receiver to use a receiving method corresponding to the first transmission method while extracting the high-speed data from the combined signal, regardless of the low-speed data signal embedded in the combined signal.

The data transmitter may further include: a first transmission line for receiving the high-speed data; and a second transmission line for receiving the low-speed data, wherein the first and second transmission lines may be different lines.

The data transmitter may not have a separate low-speed data transmission line to the data receiver.

The low-speed data signal processor may output through the second transmission line a response that the low-speed data has been received, after receiving a response that the low-speed data has been received from the data receiver.

According to another aspect of the exemplary embodiments, there is provided a data receiver for receiving high-speed data and low-speed data from a data transmitter, the data receiver including: a high-speed data processor for receiving a combined signal generated by embedding a low-speed data signal according to a second transmission method in a high-speed data signal according to a first transmission method, and extracting the high-speed data from the combined signal by using a receiving method corresponding to the first transmission method regardless of the low-speed data signal embedded in the combined signal; and a low-speed data processor for extracting the low-speed data from the combined signal by using a receiving method corresponding to the second transmission method.

The data receiver may further include: a first transmission line for outputting the high-speed data; and a second transmission line for outputting the low-speed data, wherein the first and second transmission lines may be different lines.

The data receiver may not have a separate low-speed data reception line from the data transmitter.

The low-speed data processor may transmit a response that the low-speed data has been received to the data transmitter, after receiving through the second transmission line a response that the low-speed data has been received.

According to another aspect of the exemplary embodiments, there is provided a signal converter for converting a signal of a first network having a separate urgent data line to a signal of a second network not having a separate urgent data line, the signal converter including: a normal data processor for receiving normal data through a normal data line of the first network, and generating a normal data signal including the normal data by using a first transmission method; an urgent data processor for receiving urgent data through the urgent data line of the first network, and generating an urgent data signal including the urgent data by using a second transmission method; and an embedder for generating a combined signal by embedding the urgent data signal in the normal data signal, and transmitting the combined signal through the second network, wherein the second transmission method enables a data receiver to use a receiving method corresponding to the first transmission method while extracting the normal data from the combined signal, regardless of the urgent data signal embedded in the combined signal.

The urgent data processor may transmit through the urgent data line of the first network a response that the urgent data has been received, after receiving through the second network a response that the urgent data has been received.

According to another aspect of the exemplary embodiments, there is provided a signal converter for converting a signal of a second network which does not have a separate urgent data line to a signal of a first network which has a separate urgent data line, the signal converter including: a normal data processor for receiving a combined signal through the second network, wherein the combined signal is generated by embedding an urgent data signal according to a second transmission method in a normal data signal according to a first transmission method, extracting the normal data from the combined signal by using a receiving method corresponding to the first transmission method regardless of the urgent data signal embedded in the combined signal, and transmitting the normal data through a normal data line of the first network; and an urgent data processor for extracting the urgent data from the combined signal by using a receiving method corresponding to the second transmission method, and transmitting the urgent data through the urgent data line of the first network.

The urgent data processor may transmit through the second network a response that the urgent data has been received, after receiving, through the urgent data line of the first network, a response that the urgent data has been received.

The first network may be a high-definition multimedia interface (HDMI) network.

The urgent data may be consumer electronics control (CEC) information.

According to another aspect of the exemplary embodiments, there is provided a computer readable recording medium having embodied thereon instructions that, when executed by a computer, causes the computer to perform any one of the above methods.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Figure 1:
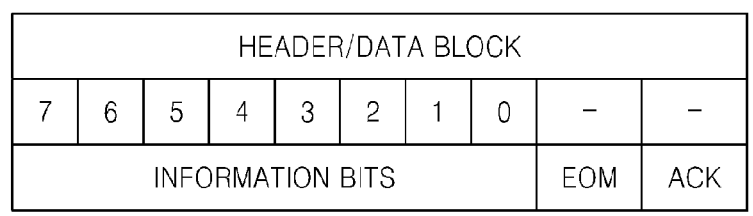
FIG. 1 is a diagram illustrating a structure of a block used in a high-definition multimedia interface-consumer electronics control (HDMI-CEC) protocol.

Hereinafter, the various aspects will be described more fully with reference to the accompanying drawings, in which exemplary embodiments are shown. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art.

Also, while describing the exemplary embodiments, detailed descriptions about related well-known functions or configurations that may diminish the clarity of the points of the exemplary embodiments are omitted. The terms used herein are defined considering functions in the exemplary embodiments, and thus may differ according to intentions or customs of a user or an operator. Accordingly, the terms are defined based on the overall descriptions in the specification. Also, when a part "includes" an element, the part may include another element unless otherwise defined. For convenience of description, an apparatus and a method may be described together if required.

In the drawings, like reference numerals denote like elements, and if required, an element shown on another drawing may be referred to. The sizes of elements may be exaggerated for clarity.

Figure 5:
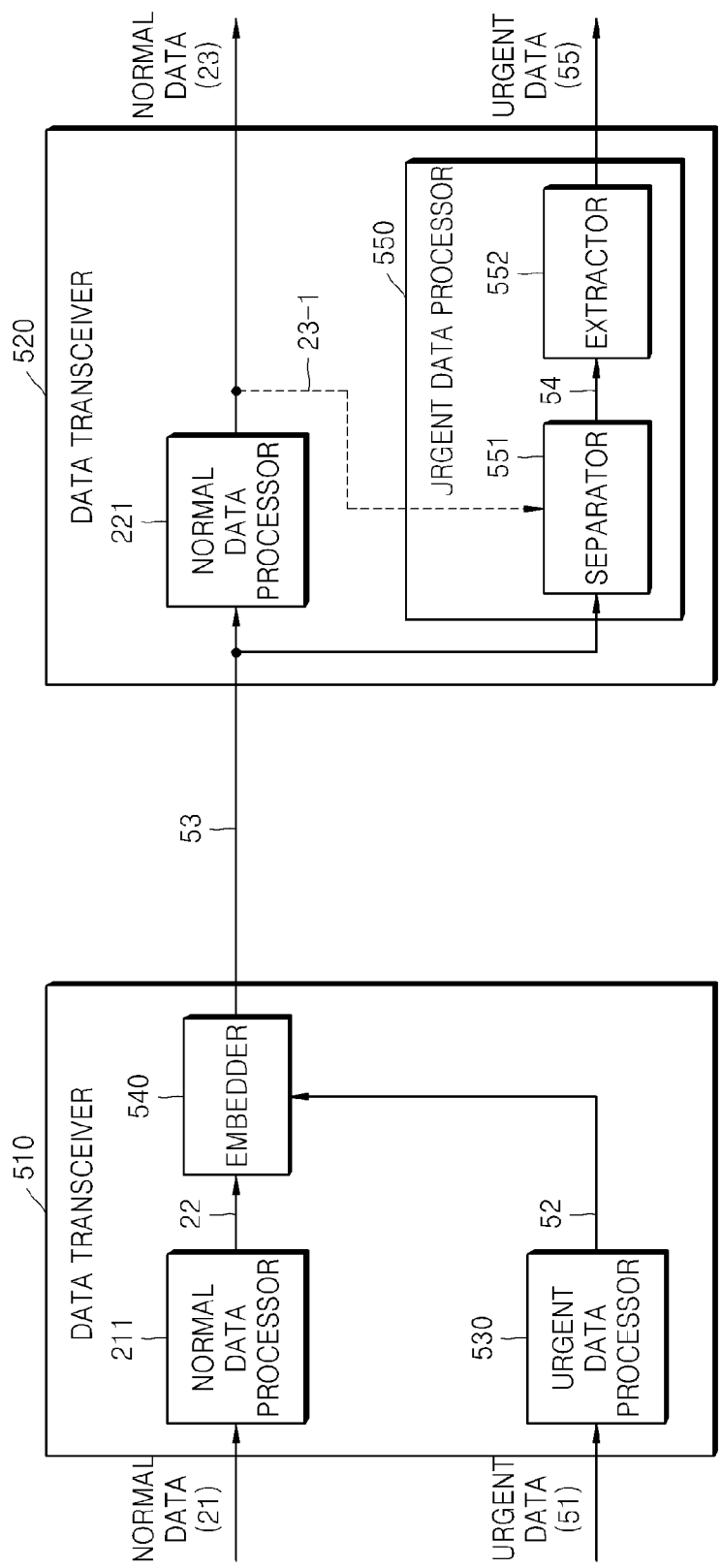
FIG. 5 is a diagram schematically illustrating structures of data transceivers according to an exemplary embodiment.

FIG. 5 is a diagram schematically illustrating structures of data transceivers 510 and 520 according to an exemplary embodiment. For convenience of description, FIG. 5 only illustrates elements regarding unidirectional transmission, and does not illustrate corresponding elements regarding reverse directional transmission. Details described below also apply to the reverse directional transmission, such as transmitting of an acknowledgement (ACK) message.

When S(t) denotes a normal data signal and I(t) denotes an urgent data signal embedded in the normal data signal, a signal Y(t) transmitted in a non-consumer electronics control (CEC) network may be represented by Equation 1 below.

$$Y(t)=S(t)+I(t) \quad \text{[Equation 1]}$$

When the urgent data signal I(t) is generated in such a way that the urgent data signal I(t) does not affect or minimally affects the normal data signal S(t), and transmitted simultaneously with the normal data signal S(t), a receiver is able to use a related art method of receiving a normal data signal, regardless of whether the urgent data signal I(t) is embedded in the normal data signal S(t) or not, while performing demodulation or decoding to obtain normal data. Accordingly, urgent data is transmitted in real time without using a separate urgent data line while maintaining the transmission performance of the normal data, and an ACK message is received from the receiver according to CEC bit timing.

Referring to FIG. 5, elements related to transmission in the data transceiver 510 include a normal data processor 211, an urgent data processor 530, and an embedder 540.

Figure 2:
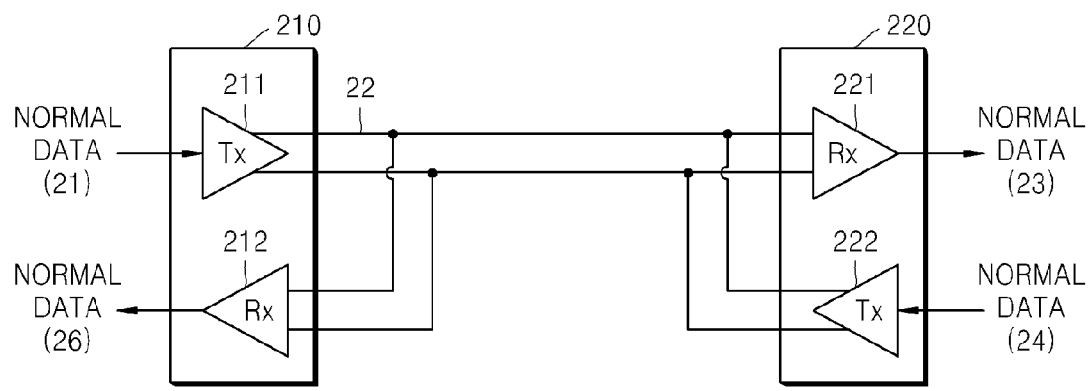
FIG. 2 is a diagram schematically illustrating structures of data transceivers of a general non-CEC network.
Figure 3:
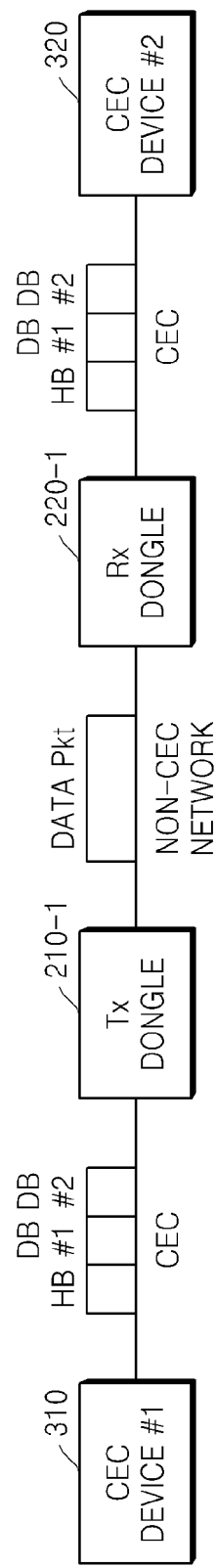
FIG. 3 is a diagram for describing a case when two CEC devices are connected through a non-CEC network.
Figure 4:
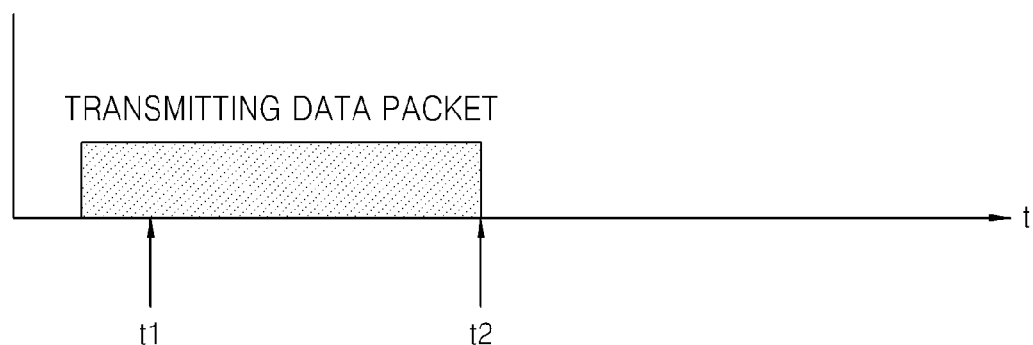
FIG. 4 is a diagram for describing a transmission delay when a CEC message is received while transmitting a data packet.

The normal data processor 211 receives normal data 21 through a normal data line of a CEC network and generates a normal data signal 22 including the normal data 21 by performing modulation or encoding. Since the normal data processor 211 performs the same operations as the transmitter 211 of FIG. 2, the same reference numeral is given to the normal data processor 211. The modulation or encoding performed by the normal data processor 211 will now be referred to as a first transmission method for convenience of description.

The urgent data processor 530 receives urgent data 51 through an urgent data line of the CEC network, and generates an urgent data signal 52 including the urgent data 51 by performing modulation or encoding. The modulation or encoding performed by the urgent data processor 530 will now be referred to as a second transmission method. The second transmission method is a method that does not affect or minimally affect data transmission of the first transmission method. Examples of the first and second transmission methods will be described later in detail with reference to FIGS. 6 through 10.

The embedder 540 generates a combined signal 53 by embedding the urgent data signal 52 in the normal data signal 22, and transmits the combined signal 53 to the data transceiver 520.

Elements related to reception in the data transceiver 520 include a normal data processor 221 and an urgent data processor 550.

The normal data processor 221 receives the combined signal 53 from the data transceiver 510, obtains normal data 23 by performing demodulation or decoding corresponding to the first transmission method on the combined signal 53, and outputs the normal data 23 through the normal data line of the CEC network. Here, the normal data processor 221 performs the demodulation or decoding according to the first transmission method regardless of the urgent data signal 52 embedded in the combined signal 53, i.e., regardless of the second transmission method. Accordingly, the normal data processor 221 performs the same operations as the receiver 221 of FIG. 2, and thus the same reference numeral is given to the normal data processor 221.

The urgent data processor 550 receives the combined signal 53 from the data transceiver 510, obtains urgent data 55 by performing demodulation or decoding corresponding to the second transmission method on the combined signal 53, and outputs the urgent data 55 through an urgent data line of the CEC network. If there is no error, the urgent data 55 is identical to the urgent data 51. According to an embodiment, the urgent data processor 550 may use the first and second transmission methods together to obtain the urgent data 55, and may use the normal data 23 obtained by the normal data processor 221, as indicated by a reference numeral 23-1.

The urgent data processor 550 may include a separator 551 and an extractor 552. The separator 551 separates an urgent data signal 54 from the combined signal 53, wherein the urgent data signal 54 is identical or similar to the urgent data signal 52 of the data transceiver 510. In order to separate the urgent data signal 54 from the combined signal 53, the separator 551 may use the first and second transmission methods together, and may use the normal data 23 obtained by the normal data processor 221 as indicated by the reference numeral 23-1. The extractor 552 extracts the urgent data 55 from the urgent data signal 54, and outputs the urgent data 55 through the urgent data line of the CEC network.

Unlike a related art technology, the data transceiver 510 does not output an ACK message immediately after receiving the urgent data 51 from the CEC network. Instead, the data transceiver 510 transmits the urgent data 51 to the data transceiver 520 as described above, and transmits the ACK message to the CEC network after receiving an ACK message from the data transceiver 520 through corresponding reverse directional elements.

The data transceiver 520 transmits an ACK message to the data transceiver 510 after receiving the urgent data 51 from the data transceiver 510, outputting the urgent data 55 to the CEC network, and receiving an ACK message from the CEC network.

Examples of the first and second transmission methods will now be described with reference to FIGS. 6 through 10.

Figure 6:
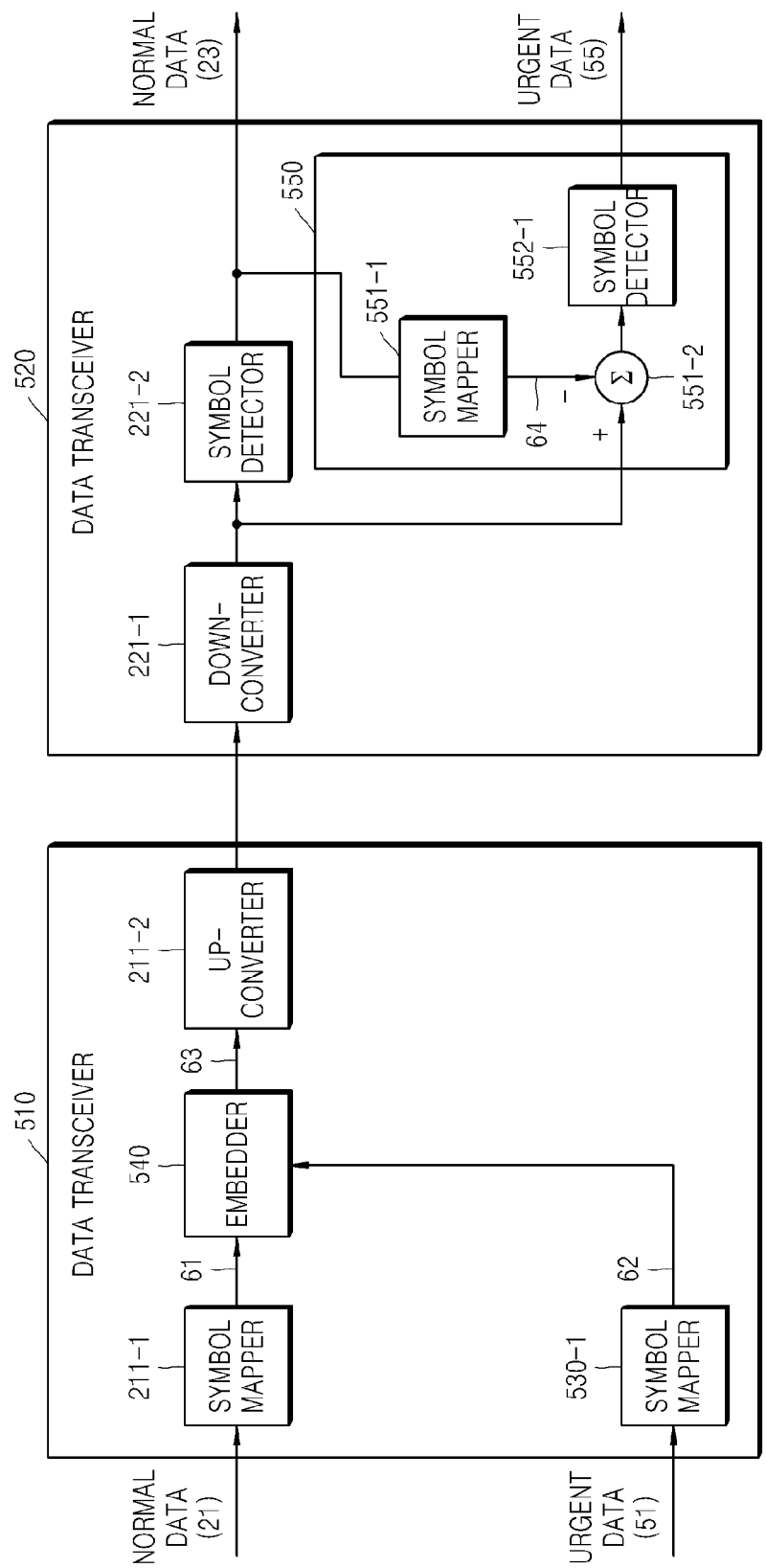
FIG. 6 is a diagram for describing the data transceivers using a digital modulation method according to an exemplary embodiment.

FIG. 6 is a diagram for describing the data transceivers 510 and 520 using a digital modulation method according to an exemplary embodiment.

Referring to FIG. 6, elements related to transmission in the data transceiver 510 includes a symbol mapper 211-1, a symbol mapper 530-1, the embedder 540, and an up-converter 211-2. The symbol mapper 211-1 and the symbol mapper 530-1 respectively map the normal data 21 and the urgent data 51 respectively into a normal data symbol 61 and an urgent data symbol 62. The embedder 540 generates a combined symbol 63 by adding the normal data symbol 61 and the urgent data symbol 62, and the up-converter 211-2 modulates and transmits the combined symbol 63. Here, the symbol mapper 211-1 and the up-converter 211-2 operate as the normal data processor 211 of FIG. 5, and the symbol mapper 530-1 operates as the urgent data processor 530 of FIG. 5.

According to the digital modulation method, since a transmission rate of normal data is high, more energy is assigned to each symbol of normal data, but since a transmission rate of urgent data is low, for example, about 400 bps in HDMI-CEC, less energy is assigned according to each symbol of urgent data.

Figure 7:
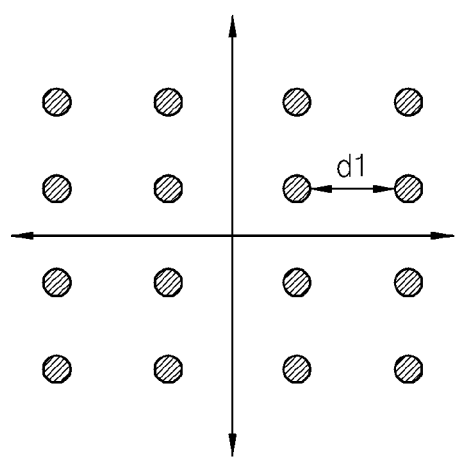
FIGS. 7 through 9 are constellation diagrams for describing a symbol mapping method according to exemplary embodiments.
Figure 8:
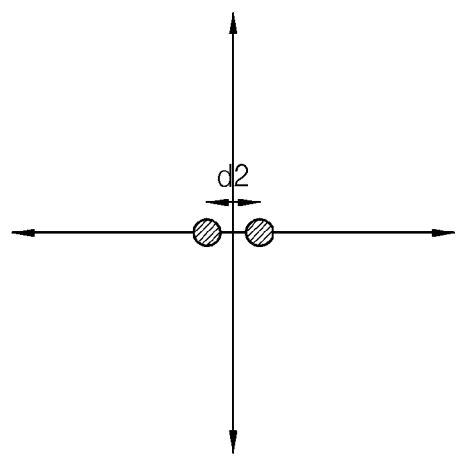
Figure 9:
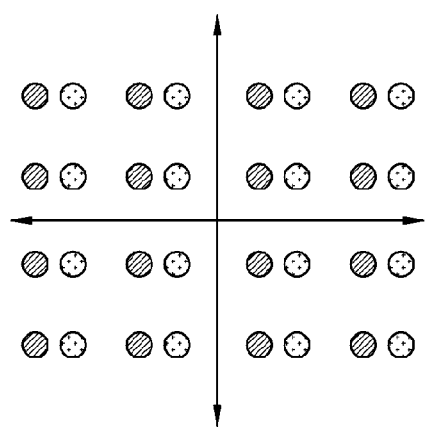

FIGS. 7 through 9 are constellation diagrams for describing a symbol mapping method according to exemplary embodiments.

FIG. 7 is the constellation diagram of the normal data symbol 61 mapped by the symbol mapper 211-1, using a 16 quadrature amplitude modulation (QAM) method having a high transmission rate. FIG. 8 is the constellation diagram of the urgent data symbol 62 mapped by the symbol mapper 530-1, using a binary phase-shift keying (BPSK) method having a low transmission rate.

In the constellation diagrams, d1 denotes a distance between constellation points of the normal data symbol 61 and d2 denotes a distance between constellation points of the urgent data symbol 62. d1 and d2 must meet the relation d1>d2 so that the normal data symbol 61 is detected regardless of the urgent data symbol 62. Preferably, d1 and d2 must meet the relation d1>>d2 so as to reduce a transmission error of normal data while transmitting urgent data under an environment with noise.

FIG. 9 is the constellation diagram of the combined symbol 63 generated by the embedder 540. Referring to FIG. 9, it seems that noise is added to constellation points of the normal data symbol 61, however the overall shape is maintained.

Referring back to FIG. 6, elements related to reception in the data transceiver 520 include a down converter 221-1, a symbol detector 221-2, a symbol mapper 551-1, a subtractor 551-2, and a symbol detector 552-1. The data transceiver 520 down-converts a received signal with the down converter 221-1, and then obtains normal data 23 by detecting a normal data symbol with the symbol detector 221-2. A symbol error rate may increase since urgent data is noise to normal data, but when d1>>d2, the amount of noise is small, and thus an accurate symbol detection is possible. The symbol mapper 551-1 maps the normal data 23 to generate a normal data symbol 64, and if there is no error, the normal data symbol 64 is identical to the normal data symbol 61. The normal data symbol 64 is subtracted from the down-converted signal by the down-converter 221-1, and an urgent data symbol is detected so as to obtain urgent data 55. Since the urgent data 55 has a low transmission rate, the urgent data 55 may be stably transmitted with low symbol energy through suitable encoding or the like.

Figure 10:
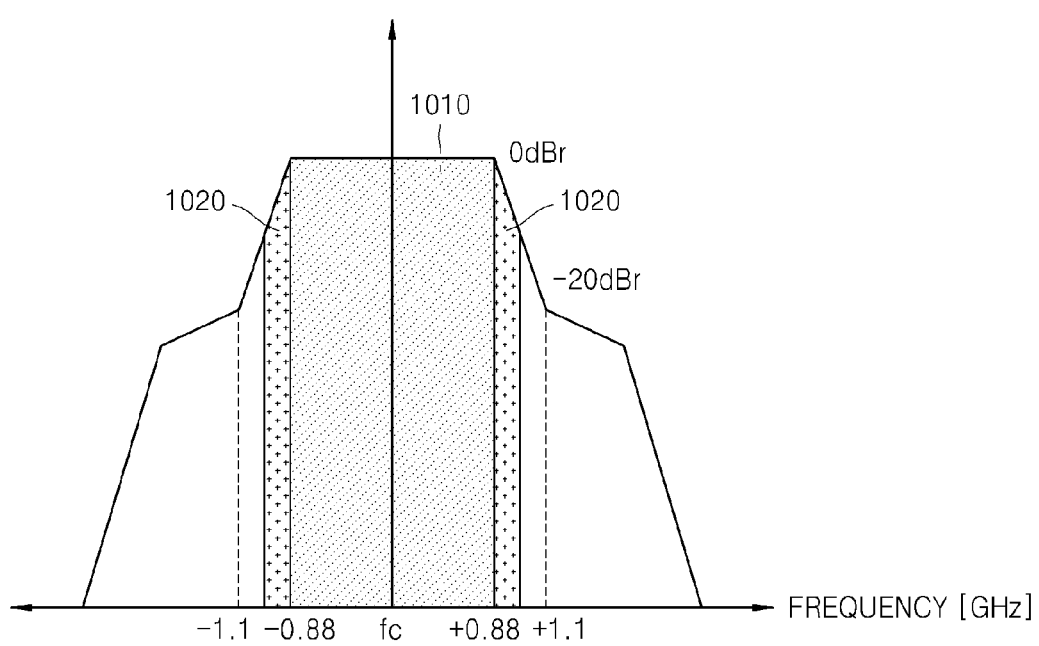
FIG. 10 is a diagram for describing the data transceivers using a spectral mask according to an exemplary embodiment.

FIG. 10 is a diagram for describing the data transceivers 510 and 520 using a spectral mask according to an exemplary embodiment.

Referring to FIG. 10, when the first transmission method for transmitting the normal data 21 is a band-limited communication method, the urgent data signal 52 may be transmitted through a spectral mask 1020 on right and left of a spectrum 1010 of the normal data signal 22. Here, by sufficiently decreasing power of the urgent data signal 52, the urgent data signal 52 does not affect the normal data signal 22, and since a transmission rate of the urgent data 51 is low, the urgent data 51 may be suitably encoded to be stably transmitted with low signal power.

According to another exemplary embodiment, the first transmission method may be an orthogonal frequency-division multiplexing (OFDM) method. Here, the urgent data 51 may be transmitted by using an unused subcarrier in a bandwidth of the normal data signal 22.

According to another exemplary embodiment, a differential signal may be used. In other words, when V+(t) and V−(t) denote differential signals, D(t) denotes a differential mode signal, and C(t) denotes a common mode signal, a normal data signal S(t) may be encoded according to the equations below.

$$V_+(t) = \frac{1}{2}S(t)$$

$$V_-(t) = -\frac{1}{2}S(t)$$

$$D(t) = V_{+(t)} - V_{-(t)} = \frac{1}{2}S(t) - \left[-\frac{1}{2}S(t)\right] = \frac{1}{2}S(t) + \frac{1}{2}S(t) = S(t)$$

$$C(t) = \frac{1}{2}[V_+(t) + V_-(t)]$$
$$= \frac{1}{2}\left\{\left[\frac{1}{2}S(t) + \left[-\frac{1}{2}S(t)\right]\right]\right\}$$
$$= \frac{1}{2}\left[\frac{1}{2}S(t) - \frac{1}{2}S(t)\right]$$
$$= 0$$

An urgent data signal I(t) may be embedded in the differential signals V+(t) and V−(t) as follows.

$$V'_+(t) = V_+(t) + I(t)$$

$$V'_-(t) = V_-(t) + I(t)$$

Here, D'(t) and C'(t) are represented as follows.

$$D'(t) = V'_+(t) - V'_-(t) = V_+(t) - V_-(t) = D(t)$$

$$C'(t) = \frac{1}{2}[V'_{+(t)} + V'_{-(t)}]$$
$$= \frac{1}{2}[V_{+(t)} + V_{-(t)}] + \frac{1}{2}[I(t) + I(t)] += I(t)$$

Here, since D(t) and D'(t) are the same, the urgent data signal I(t) does not affect the normal data signal S(t), and the urgent data signal I(t) may be obtained from the common mode signal C(t).

Figure 11:
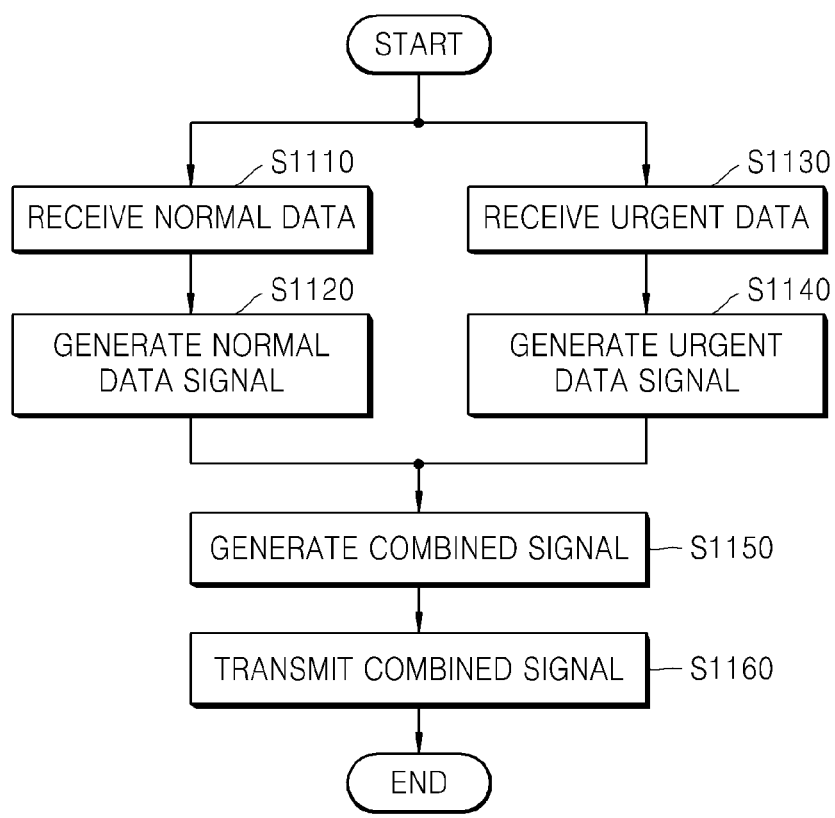
FIG. 11 is a flowchart illustrating a method of converting a CEC network signal to a non-CEC network signal, according to an exemplary embodiment.

FIG. 11 is a flowchart illustrating a method of converting a CEC network signal to a non-CEC network signal, according to an exemplary embodiment.

Referring to FIG. 11, the method includes receiving normal data through a normal data line of the CEC network in operation S1110, receiving urgent data through an urgent data line of the CEC network in operation S1130, generating a normal data signal including the normal data by using a first transmission method in operation S1120, generating an urgent data signal including the urgent data by using a second transmission method in operation S1140, generating a combined signal by embedding the urgent data signal in the normal data signal in operation S1150, and transmitting the combined signal through the non-CEC network in operation S1160.

Figure 12:
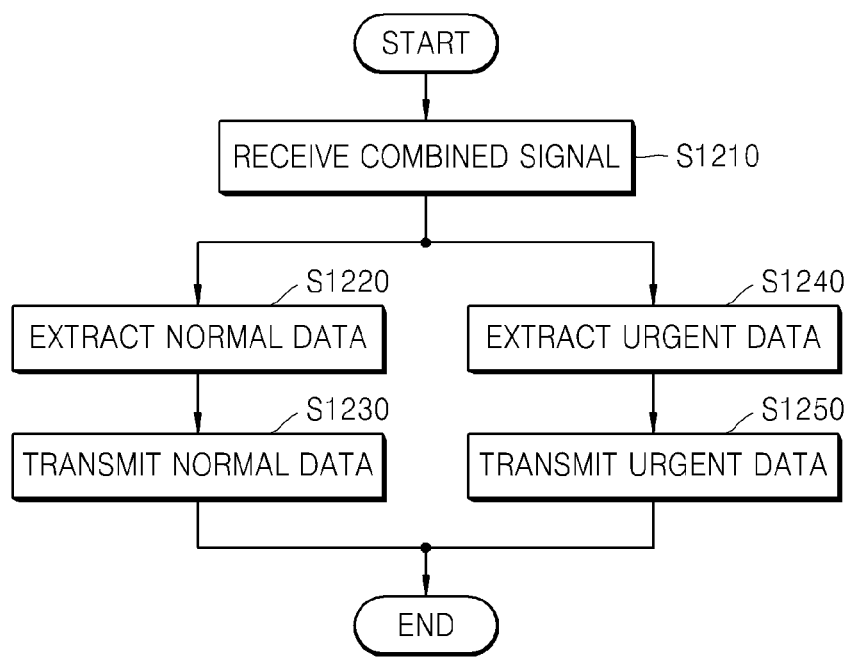
FIG. 12 is a flowchart illustrating a method of converting a non-CEC network signal to a CEC network signal, according to an exemplary embodiment.

FIG. 12 is a flowchart illustrating a method of converting a non-CEC network signal to a CEC network signal, according to an exemplary embodiment.

Referring to FIG. 12, the method includes receiving a combined signal through the non-CEC network in operation S1210, wherein the combined signal is generated by embedding an urgent data signal according to a second transmission method in a normal data signal according to a first transmission method, extracting normal data from the combined signal in operation S1220 by using a receiving method corresponding to the first transmission method regardless of the urgent data signal embedded in the combined signal, extracting urgent data from the combined signal in operation S1240 by using a receiving method corresponding to the second transmission method, transmitting the extracted normal data through a normal data line of the CEC network in operation S1230, and transmitting the extracted urgent data through an urgent data line of the CEC network in operation S1250.

The exemplary embodiments can also be embodied as computer readable codes on a computer readable recording medium. Examples of the computer readable recording medium include magnetic storage media, optical recording media, and storage media.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting high-speed data and low-speed data to a data receiver, wherein the method is performed by a data transmitter, the method comprising:
generating a high-speed data signal including the high-speed data, by using a first transmission method;
generating a low-speed data signal including the low-speed data, by using a second transmission method;
generating a combined signal by embedding the low-speed data signal in the high-speed data signal; and
transmitting the combined signal,
wherein the data receiver extracts the high-speed data from the combined signal, based on a receiving method corresponding to the first transmission method, and
wherein the data receiver extracting based on the receiving method corresponding to the first transmission method, is independent of the low-speed data signal embedded in the combined signal.

2. The method of claim 1, wherein the low-speed data is consumer electronics control (CEC) information.

3. The method of claim 1, wherein the first transmission method is a first digital modulation method and the second transmission method is a second digital modulation method.

4. The method of claim 3, wherein a distance between constellation points of the second digital modulation method is shorter than a distance between constellation points of the first digital modulation method.

5. The method of claim 4, wherein the second digital modulation method is a binary phase-shift keying (BPSK) method.

6. The method of claim 1, wherein the first transmission method is a band-limited communication method and the second transmission method is a method of transmitting the low-speed data by using a spectral mask of the first transmission method.

7. The method of claim 1, wherein the first transmission method is an orthogonal frequency-division multiplexing (OFDM) method and the second transmission method is a method of transmitting the low-speed data by using an unused subcarrier in the first transmission method.

8. The method of claim 1, wherein the combined signal is a differential signal, the first transmission method is a method of transmitting the high-speed data in a differential mode signal, and the second transmission method is a method of transmitting the low-speed data in a common mode signal.

9. The method of claim 1, further comprising:
receiving the high-speed data through a first transmission line; and
receiving the low-speed data through a second transmission line,
wherein the first and the second transmission lines are different.

10. The method of claim 9, wherein the data transmitter does not have a separate low-speed data transmission line to the data receiver.

11. The method of claim 9, further comprising:
receiving a first response from the data receiver indicating that the low-speed data has been received; and
after receiving the first response from the data receiver, outputting, through the second transmission line, a second response indicating that the low-speed data has been received.

12. A computer readable recording medium having recorded thereon a program for executing the method of claim 1.

13. A method of receiving high-speed data and low-speed data from a data transmitter, wherein the method is performed by a data receiver, the method comprising:
receiving a combined signal generated by embedding a low-speed data signal using a second transmission method in a high-speed data signal using a first transmission method;
extracting the high-speed data from the combined signal based on a receiving method corresponding to the first transmission method, the extracting being independent of the low-speed data signal embedded in the combined signal; and
extracting the low-speed data from the combined signal, based on a receiving method corresponding to the second transmission method.

14. The method of claim 13, wherein the low-speed data is consumer electronics control (CEC) information.

15. The method of claim 13, wherein, in the extracting of the low-speed data, the low-speed data is extracted by using the extracted high-speed data.

16. The method of claim 13, wherein the first transmission method is a first digital modulation method and the second transmission method is a second digital modulation method.

17. The method of claim 16, wherein a distance between constellation points of the second digital modulation method is shorter than a distance between constellation points of the first digital modulation method.

18. The method of claim 17, wherein, in the extracting of the high-speed data, the high-speed data is extracted by demodulating the combined signal according to the first digital modulation method, and
the extracting of the low-speed data comprises:
generating a high-speed data signal including the extracted high-speed data by using the first digital modulation method;
generating a low-speed data signal by subtracting the generated high-speed data signal from the combined signal; and
extracting the low-speed data by demodulating the generated low-speed data signal according to the second digital modulation method.

19. The method of claim 16, wherein the second digital modulation method is a binary phase-shift keying (BPSK) method.

20. The method of claim 13, wherein the first transmission method is a band-limited communication method, and the second transmission method is a method of transmitting the low-speed data through a spectral mask of the first transmission method.

21. The method of claim 13, wherein the first transmission method is an orthogonal frequency-division multiplexing (OFDM) method, and the second transmission method is a method of transmitting the low-speed data by using an unused subcarrier in the first transmission method.

22. The method of claim 13, wherein the combined signal is a differential signal, the first transmission method is a method of transmitting the high-speed data in a differential mode signal, and the second transmission method is a method of transmitting the low-speed data in a common mode signal.

23. The method of claim 22, wherein, in the extracting of the high-speed data, the differential mode signal is extracted from the combined signal, and in the extracting of the low-speed data, the common mode signal is extracted from the combined signal.

24. The method of claim 13, further comprising:
outputting the high-speed data through a first transmission line; and
outputting the low-speed data through a second transmission line,
wherein the first and the second transmission line are different lines.

25. The method of claim 24, wherein the data receiver does not have a separate low-speed data reception line from the data transmitter.

26. The method of claim 24, further comprising:
receiving a first response indicating that the low-speed data has been received through the second transmission line; and
after receiving the first response through the second transmission line, transmitting a second response indicating that the low-speed data has been received to the data transmitter.

27. A computer readable recording medium having recorded thereon a program for executing the method of claim 13.

28. A method of converting a signal of a first network having a separate urgent data line to a signal of a second network not having a separate urgent data line, the method comprising:
receiving normal data through a normal data line of the first network;
receiving urgent data through the urgent data line of the first network;

generating a normal data signal including the normal data by using a first transmission method;

generating an urgent data signal including the urgent data by using a second transmission method;

generating a combined signal by embedding the urgent data signal in the normal data signal; and transmitting the combined signal through the second network, wherein the a data receiver extracts the normal data from the combined signal, based on a receiving method corresponding to the first transmission method, wherein the data receiver extracting based on the receiving method corresponding to the first transmission method, is independent of the urgent data signal embedded in the combined signal.

29. The method of claim 28, further comprising:

receiving, through the second network, a first response indicating that the urgent data has been received; and after receiving the first response through the second network, transmitting, through the urgent data line of the first network, a second response indicating that the urgent data has been received.

30. A computer readable recording medium having recorded thereon a program for executing the method of claim 28.

31. A method of converting a signal of a second network not having a separate urgent data line to a signal of a first network having a separate urgent data line, the method comprising:

receiving a combined signal through the second network, wherein the combined signal is generated by embedding an urgent data signal according to a second transmission method in a normal data signal according to a first transmission method;

extracting the normal data from the combined signal by using a receiving method corresponding to the first transmission method, regardless of the urgent data signal embedded in the combined signal;

extracting the urgent data from the combined signal by using a receiving method corresponding to the second transmission method;

transmitting the normal data through a normal data line of the first network; and transmitting the urgent data through the urgent data line of the first network.

32. The method of claim 31, wherein, in the extracting of the urgent data, the urgent data is extracted by using the extracted normal data.

33. The method of claim 31, further comprising:

receiving, through the urgent data line of the first network, a first response indicating that the urgent data has been received; and after receiving the first response through the urgent data line of the first network, transmitting, through the second network, a second response indicating that the urgent data has been received.

34. The method of claim 31, wherein the first network is high-definition multimedia interface (HDMI).

35. The method of claim 31, wherein the urgent data is consumer electronics control (CEC) information.

36. A computer readable recording medium having recorded thereon a program for executing the method of claim 31.

37. A data transmitter which transmits high-speed data and low-speed data to a data receiver, the data transmitter comprising:

a high-speed data signal processor which generates a high-speed data signal including the high-speed data, by using a first transmission method;

a low-speed data signal processor which generates a low-speed data signal including the low-speed data, by using a second transmission method; and an embedder which generates a combined signal by embedding the low-speed data signal in the high-speed data signal, and transmitting the combined signal, wherein the data receiver extracts the high-speed data from the combined signal based on a receiving method corresponding to the first transmission method, wherein the data receiver extracting based on the receiving method corresponding to the first transmission method, is independent of the low-speed data signal embedded in the combined signal.

38. The data transmitter of claim 37, further comprising:

a first transmission line which receives the high-speed data; and a second transmission line which receives the low-speed data, wherein the first and the second transmission lines are different lines.

39. The data transmitter of claim 38, wherein the data transmitter does not have a separate low-speed data transmission line to the data receiver.

40. The data transmitter of claim 38, wherein the low-speed data signal processor outputs, through the second transmission line, a second response which indicates that the low-speed data has been received, after receiving a first response which indicates that the low-speed data has been received from the data receiver.

41. The data receiver of claim 39, further comprising:

a first transmission line for outputting the high-speed data; and a second transmission line for outputting the low-speed data, wherein the first and the second transmission lines are different lines.

42. The data receiver of claim 41, wherein the data receiver does not have a separate low-speed data reception line from the data transmitter.

43. The data receiver of claim 41, wherein the low-speed data processor transmits a second response which indicates that the low-speed data has been received to the data transmitter, after receiving, through the second transmission line, a first response which indicates that the low-speed data has been received.

44. A data receiver which receives high-speed data and low-speed data from a data transmitter, the data receiver comprising:

a high-speed data processor which receives a combined signal generated by embedding a low-speed data signal according to a second transmission method in a high-speed data signal according to a first transmission method, and extracts the high-speed data from the combined signal based on a receiving method corresponding to the first transmission method, wherein the high-speed data processor extracting based on the receiving method corresponding to the first transmission method, is independent of the low-speed data signal embedded in the combined signal; and a low-speed data processor which extracts the low-speed data from the combined signal by using a receiving method corresponding to the second transmission method.

45. A signal converter which converts a signal of a first network which has a separate urgent data line to a signal of a second network which does not have a separate urgent data line, the signal converter comprising:
- a normal data processor which receives normal data through a normal data line of the first network, and generates a normal data signal including the normal data by using a first transmission method;
- an urgent data processor which receives urgent data through the urgent data line of the first network, and generates an urgent data signal including the urgent data by using a second transmission method; and
- an embedder which generates a combined signal by embedding the urgent data signal in the normal data signal, and transmits the combined signal through the second network,
- wherein a data receiver uses a receiving method corresponding to the first transmission method to extract the normal data from the combined signal, regardless of the urgent data signal embedded in the combined signal.

46. The signal converter of claim 45, wherein the urgent data processor transmits, through the urgent data line of the first network, a second response which indicates that the urgent data has been received, after receiving, through the second network, a first response which indicates that the urgent data has been received.

47. A signal converter which converts a signal of a second network which does not have a separate urgent data line to a signal of a first network which has a separate urgent data line, the signal converter comprising:
- a normal data processor which receives a combined signal through the second network, wherein the combined signal is generated by embedding an urgent data signal according to a second transmission method in a normal data signal according to a first transmission method, extracts the normal data from the combined signal based on a receiving method corresponding to the first transmission method, wherein the normal data processor extracting based on the receiving method corresponding to the first transmission method, is independent of the urgent data signal embedded in the combined signal, and transmits the normal data through a normal data line of the first network; and
- an urgent data processor which extracts the urgent data from the combined signal by using a receiving method corresponding to the second transmission method, and transmits the urgent data through the urgent data line of the first network.

48. The signal converter of claim 47, wherein the urgent data processor transmits, through the second network, a second response which indicates that the urgent data has been received, after receiving, through the urgent data line of the first network, a first response which indicates that the urgent data has been received.

49. The signal converter of claim 47, wherein the first network is high-definition multimedia interface (HDMI).

50. The signal converter of claim 47, wherein the urgent data is consumer electronics control (CEC) information.

51. A method of transmitting high-speed data and low-speed data to a data receiver, wherein the method is performed by a data transmitter, the method comprising:
- generating a high-speed data signal including the high-speed data, by using a first transmission method;
- generating a low-speed data signal including the low-speed data, by using a second transmission method;
- generating a combined signal by embedding the low-speed data signal in the high-speed data signal; and
- transmitting the combined signal,
- wherein the data receiver uses a receiving method corresponding to the first transmission method to extract the high-speed data from the combined signal, regardless of the low-speed data signal embedded in the combined signal and regardless of the second transmission method.

* * * * *